Jan. 5, 1943. D. B. BOSTICK 2,307,008
APPARATUS FOR FEEDING MATERIALS
Filed Aug. 19, 1940 2 Sheets-Sheet 2

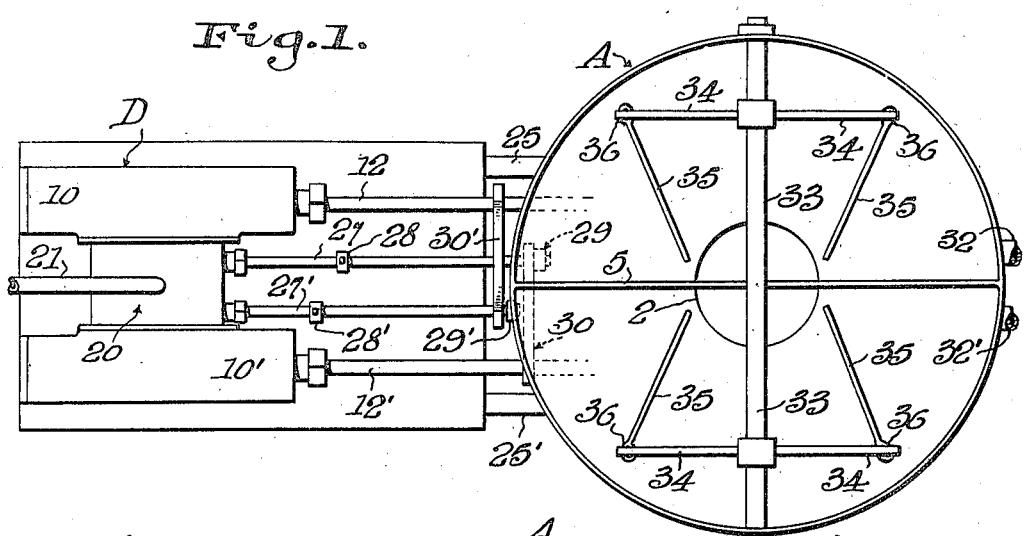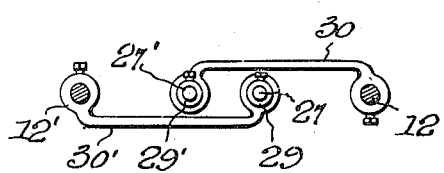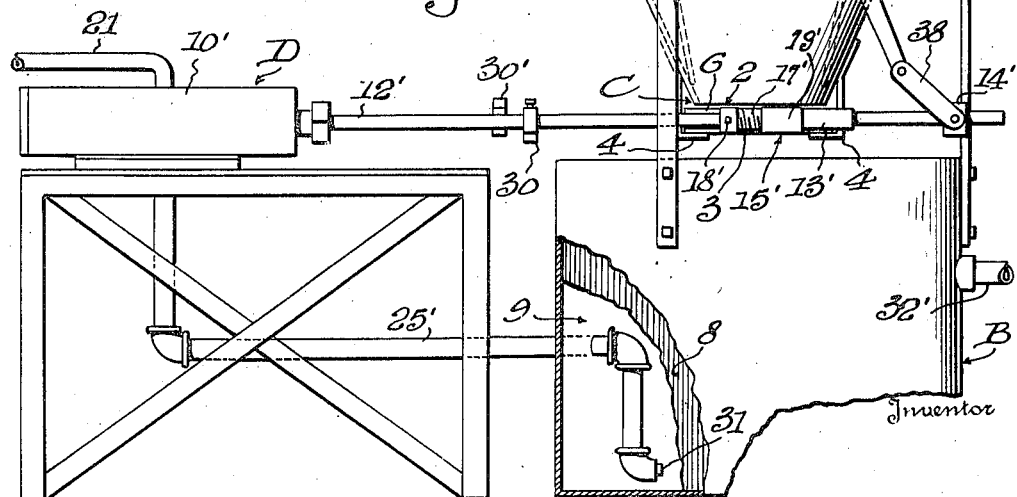

Inventor
David B. Bostick
By Baldwin & Wight
his Attorneys

Patented Jan. 5, 1943

2,307,008

UNITED STATES PATENT OFFICE 2,307,008

APPARATUS FOR FEEDING MATERIALS

David B. Bostick, Hopkinsville, Ky.

Application August 19, 1940, Serial No. 353,280

2 Claims. (Cl. 259—18)

This invention relates to apparatus for feeding materials, and more particularly to apparatus for feeding and/or mixing proportionate quantities of solid and liquid materials.

An object of the invention is to provide apparatus for feeding and mixing together accurately apportioned quantities of solid and liquid material. In accordance with one feature of the invention, the apparatus includes a positive displacement feeder for the solid material and a hydraulic motor driven by mixing fluid for operating the feeder, the fluid discharged by the motor being mixed with the solid material which has been fed by the operation of the motor. The arrangement is such that the amounts of solid and liquid materials delivered for admixture always will be correctly apportioned.

Another object of the invention is to provide apparatus for feeding measured quantities of dry material driven by a reciprocating hydraulic piston, with adjustable operating connections between the piston and feeding element such that the effective feeding movement of the feeding element may be varied with respect to a fixed piston stroke length.

Another object is to provide apparatus of the character referred to including two co-related feeding devices and operating pistons and cylinders, sequential operation of the feeding devices being effected by response of one cylinder valve to movement of the piston in the other cylinder, and vice versa.

Other objects will become apparent from a reading of the following description, the appended claims, and the accompanying drawings, in which:

Figure 1 is a top plan view of apparatus embodying the invention;

Figure 2 is a front elevation of apparatus embodying the invention;

Figure 7 is a vertical section taken on the line 7—7 of Figure 3.

Figure 3:
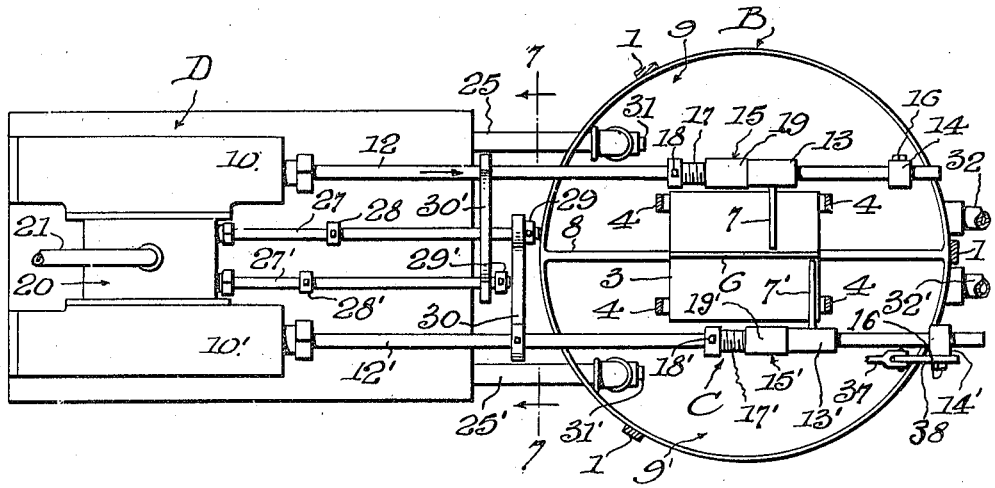
Figure 3 is a top plan view of the apparatus shown in Figures 1 and 2 but with a hopper removed.

In the illustrative embodiment shown in the accompanying drawings, a solid material container or hopper A is mounted above a mixing receptacle B by means of brackets 1. A feeder generally designated C is positioned below a discharge opening 2 in the hopper A, and is adapted to be operated by a hydraulic motor generally designated D.

The feeder, generally designated C, includes a horizontal feeder plate 3 supported below and in spaced relation to the hopper discharge opening 2 by means of brackets 4. In some instances, it is desirable to feed different solid materials into the mixing receptacle B or separate compartments therein. Accordingly, the hopper B may be divided into two compartments by means of a division wall 5. To prevent mixing of the two different solid materials after they leave the discharge opening 2 and before they are delivered to the mixing receptacle B, the feeder plate 3 may be provided with a division wall 6 directly under and aligned with the division wall 5 in the hopper A.

For positively displacing solid material which has descended from the hopper discharge opening 2 onto the feeder plate 3, two reciprocable positive displacement drag arm members 7 and 7' are mounted respectively on opposite sides of the plate division wall 6, and are arranged to be reciprocated back and forth across the plate so as to push material which has descended upon the plate off the ends of the plate into the mixing receptacle B. When it is desired to maintain the solid materials separate from each other, even after each has been mixed with a liquid, the mixing receptacle B may be provided with a division wall 8 which separates the receptacle B into two mixing compartments 9 and 9'.

In accordance with the invention, the drag member 7 is arranged to be reciprocated under the plate 3 by means of a hydraulic motor which is operated by mixing fluid, the fluid exhausted or discharged by the motor being conducted to the mixing receptacle B. Preferably, the motor is of the positive displacement expansible chamber type, and in the illustrative embodiment is shown as including a cylinder 10 and a piston 11 reciprocable therein and equipped with a piston rod 12 which extends freely through a sleeve portion 13 on the drag arm 7. Abutments $x$ and $y$ on opposite sides of the piston 11 are engageable respectively with the adjacent end walls of the cylinder 10 for limiting movement of the piston. Spaced abutments 14 and 15 secured to the piston rod 12 are arranged alternatively to contact the sleeve portion 13 of the arm 7 as the piston 11 reciprocates, so as to move the arm 7 back and forth and push solid material off the plate 3 and into the receptacle B. In order that the ratio of solid material to liquid may be varied, the abutments 14 and 15 are adapted to be positioned adjustably on the piston rod 12, the arrangement being such that, by shifting the abutments on the rod, the length of stroke given to the feeder arm 7 for a fixed or given length of piston stroke may be varied at will. As shown, the abutment 14 is secured in adjusted position on the rod 12 by means of a set screw 16. For accomplishing a fine adjustment of the position of the abutment 15, the latter is formed to comprise an externally threaded sleeve 17 secured to the rod by a set screw 18, and an internally threaded sleeve 19 screwed onto the sleeve 17. Turning of the sleeve 19 effects a nice adjustment of the position between the abutments 14 and 15, so as accurately to control the stroke of the arm 7. Referring to Figure 3, it will be seen that the piston rod 12 is moving to the right, and the abutment 15 is moving the arm 7 toward the right hand end of the plate 3. When this stroke of the piston has been completed and it moves toward the left, it will perform a considerable idle movement before the abutment 14 engages the sleeve portion 13 of the arm 7, after which continued movement of the piston rod 12 to the left will move the feed arm 7 across the plate so as to push material thereon into the receptacle B.

The positive displacement expansible chamber hydraulic motor for operating the drag member 7' is similar to the motor just described for operating the drag member 7, and therefore need not be described in detail. The parts of the motor for operating the arm 7', however, are designated by reference characters which are the same as those applied to corresponding parts of the motor for operating the member 7, with the exception that they are primed. Thus, the piston 11' and piston rod 12' for reciprocating the drag arm 7' correspond to the piston 11 and piston rod 12 for operating the drag arm 7, and so on.

The reciprocation of the piston 11 and the drag member 7 may be controlled by a valve adapted to be shifted or operated in response to movement of the piston 11' and piston rod 12'. A valve chest 20 is interposed between the cylinders 10 and 10', and is arranged to receive mixing fluid under pressure through an inlet pipe 21. A valve passage 22 leads from the left hand end of the chest 20 to the left hand of the cylinder 10, and a passage 23 leads from the right hand end of the chest 20 to the right hand end of the cylinder 10. An exhaust passage 24 leads through an exhaust or discharge pipe 25 to the compartment 9 of the mixing receptacle B. A valve of suitable form, such as a D valve 26, is reciprocable in the chest 20 for controlling the flow of mixing fluid to and from the opposite ends of the cylinder 10, and is equipped with a valve rod 27 provided with spaced tappets or collars 28 and 29. A valve-operating arm 30 secured to the piston rod 12' receives the valve rod 27 for sliding movement, and is engageable with the tappets 28 and 29 for shifting the valve 26.

A passage 22' leads from the left hand end of the valve chest 20 to the right hand end of the cylinder 10', and a passage 23' leads from the right hand end of the valve chest to the left hand end of the cylinder 10'. An exhaust passage 24' leads through a discharge pipe 25' to the compartment 9' in the mixing receptacle B. A D valve 26' for controlling the flow of mixing fluid to and from the cylinder 10' is equipped with a valve rod 27' provided with tappets 28' and 29' adapted to be engaged by the valve arm 30' secured to the piston rod 12.

Figure 4:
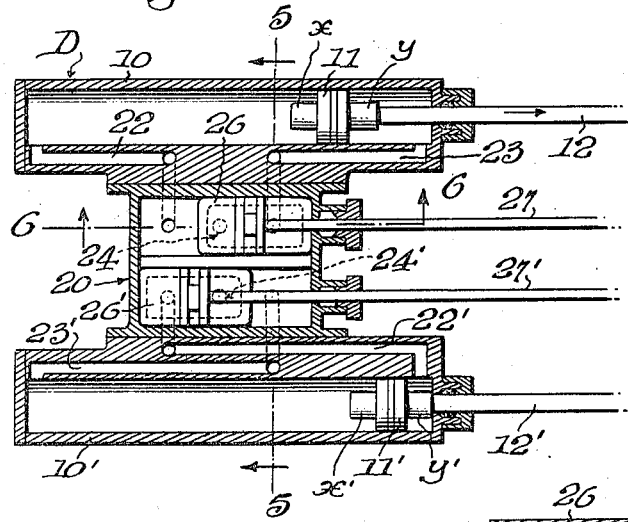
Figure 4 is a horizontal sectional view of a hydraulic motor drawn on an enlarged scale.
Figures 5, 6:
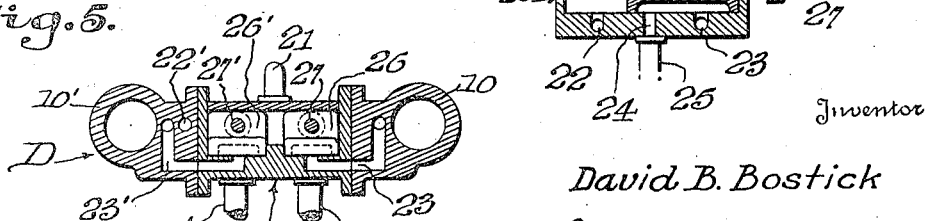
Figure 5 is a vertical sectional view taken on the line 5—5 of Figure 4.
Figure 6 is a vertical sectional view taken on the line 6—6 of Figure 4.

In operation, and assuming the parts to be in the relative positions shown in the drawings, the piston 11' and feeder arm 7' are at the extreme limits of their right-hand strokes, and the piston 11 and feeder arm 7 are moving toward the right, having not quite arrived at the limit of their right-hand strokes. When, upon further movement of the piston 11 and feeder arm 7, the valve arm 30' carried by the piston rod 12 engages the tappet 29' and moves it toward the right, the valve 26' will be shifted toward the right so as to place the right hand end of the cylinder 10' in communication with the mixing fluid supply, and, simultaneously, to place the left hand end of the cylinder 10' in communication with the exhaust pipe 25'. Fluid entering the right hand end of the cylinder 10' will then drive the piston 11' and feeder arm 7' to the left. During the latter part of this stroke of the piston 11', the valve arm 30 will engage the tappet 28 and shift the valve 26 to the left so as to place the right hand end of the cylinder 10 in communication with the mixing fluid supply, and simultaneously place the left hand end of the cylinder 10 in communication with the exhaust pipe 25. The piston 11 and drag arm 7 will then move to the left, and during the latter part of this stroke the valve arm 30' will engage the tappet 28' and move the valve 26' back to the passage shown in Figure 4 so as to admit mixing fluid under pressure to the left hand end of the cylinder 10' and move the piston 11' and drag arm 7' to the right. The pistons and associated drag arms 7 will continue to operate sequentially in this manner until the supply of mixing fluid under pressure is cut off. It will be observed that a fixed and definite volume of mixing fluid is discharged from each cylinder during each stroke of the associated piston, so that the ratio of solid material to liquid discharged into the mixing receptacle will be maintained accurately and will be maintained constant. Moreover, since the mixing fluid itself is utilized to drive the feeder for the solid material, it is not necessary to utilize electrical or other power, and this in itself effects very substantial economy in operation.

Preferably, the discharge pipes 25 and 25' are equipped respectively with restricted orifice devices 31 and 31' at their outlet ends so as to deliver the fluid into the mixing container B at high velocity thereby to maintain the mixture agitated. The mixture may be withdrawn from the mixing receptacle through outlet pipes 32 and 32' respectively.

Some solid materials which may be employed for mixing purposes have a tendency to lodge in the hopper, and it therefore is preferred to provide means for agitating the material in the hopper A. The agitating means shown includes a rock shaft 33 extending transversely of the hopper, and being provided with rock arms 34 each equipped with a pendant agitator bar 35 pivoted to the associated arm 34 as at 36. A lever 37 secured to the rock shaft 33 is connected to the collar 14' by means of a link 38. The arrangement is such that, as the piston rod 12' reciprocates, the lever 37 and shaft 33 are rocked and the agitator bars 35 are moved up and down within the hopper, preventing any lodgment of solid material therein.

The construction disclosed herein is representative of the now preferred apparatus embodying the invention, but it will be apparent that changes or modifications may be resorted to without departing from the invention as defined in the claims.

I claim:

1. In apparatus for feeding measured quantities of solid material, a supply hopper having a bottom discharge opening; a feed plate spaced below said discharge opening; two drag members mounted to reciprocate over separate paths between said feed plate and said discharge opening for positively feeding solid material off the plate and into the mixing receptacle; two hydraulic cylinders; pistons reciprocable respectively therein; piston rods respectively connecting one piston to one drag member and the other piston to the other drag member; valve means controlling the reciprocation of each piston respectively in response to movement of the other piston; and means for supplying working fluid under pressure to said cylinders.

2. In apparatus for mixing solid and liquid material, a mixing receptacle; a hopper for solid material having a bottom discharge opening above the mixing receptacle; a feed plate spaced below said discharge opening; two drag members mounted to reciprocate over separate paths between said feed plate and said discharge opening for positively feeding solid material off the plate and into the mixing receptacle; two hydraulic cylinders; pistons reciprocable respectively therein; piston rods respectively connecting one piston to one drag member and the other piston to the other drag member; valve means controlling the reciprocation of each piston respectively in response to movement of the other piston; means for supplying mixing fluid under pressure to said cylinders; and a conduit for conducting mixing fluid discharged from said cylinders into said mixing receptacle.

DAVID B. BOSTICK.